(12) United States Patent  
Hong et al.

(10) Patent No.: US 8,933,982 B2
(45) Date of Patent: Jan. 13, 2015

(54) DISPLAY-CAMERA SYSTEMS

(75) Inventors: Wei Hong, Sunnyvale, CA (US); Kar-Han Tan, Sunnyvale, CA (US); Ian N. Robinson, Pebble Beach, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 288 days.

(21) Appl. No.: 13/454,760

(22) Filed: Apr. 24, 2012

(65) Prior Publication Data

US 2013/0278844 A1 Oct. 24, 2013

(51) Int. Cl.
*H04N 7/14* (2006.01)

(52) U.S. Cl.
USPC .......................................... 348/14.01; 353/30

(58) Field of Classification Search
None
See application file for complete search history.

(56) References Cited

U.S. PATENT DOCUMENTS

| 5,282,027 | A | 1/1994 | Tanigaki et al. | |
|---|---|---|---|---|
| 5,422,683 | A | 6/1995 | Tanigaki | |
| 5,784,138 | A | 7/1998 | Kollarits et al. | |
| 6,323,892 | B1 | 11/2001 | Mihara | |
| 7,690,795 | B2 * | 4/2010 | Cole et al. | 353/30 |
| 8,035,612 | B2 | 10/2011 | Bell et al. | |
| 2009/0141116 | A1 | 6/2009 | Kanade et al. | |
| 2011/0134205 | A1 | 6/2011 | Arney et al. | |
| 2011/0227876 | A1 | 9/2011 | Ilmonen | |
| 2012/0127128 | A1 * | 5/2012 | Large et al. | 345/175 |
| 2013/0107217 | A1 * | 5/2013 | Leong et al. | 353/7 |

* cited by examiner

*Primary Examiner* — Maria El-Zoobi

(57) ABSTRACT

A display-camera system includes a liquid crystal panel having a screen side and a back side that is opposed to the screen side. A visible light camera is positioned a first spaced distance from the back side such that a field of view of the camera encompasses all or a fraction of an area of the liquid crystal panel. A visible light source is positioned a second spaced distance from the back side and outside of the field of view of the camera. A diffuser is positioned between the visible light source and the back side.

15 Claims, 4 Drawing Sheets

DISPLAY-CAMERA SYSTEMS

BACKGROUND

Some systems including a display and a camera allow users who are in different locations to see and talk to one another, creating the illusion that the participants are in the same room. One example of a display-camera system is a webcam attached to a computer. Remote collaboration and telepresence systems are other examples of display-camera systems. Each of these display-camera systems includes technology for the reception and transmission of audio-video signals so that the remotely located participants are able to communicate in real-time or without noticeable delay. Some remote collaboration and telepresence systems also include on-screen drawing capabilities and content sharing capabilities. The visual aspect of remote collaboration and telepresence systems enhances remote communications by allowing the users to perceive one another as well as any shared content.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The present disclosure relates generally to display-camera systems. The systems disclosed herein include a see-through screen and a back-light and diffuser that are strategically positioned with respect to the see-through screen. The see-through screen allows a visible light camera to be positioned behind the screen, which enables local user(s) to look at a remote user's image and/or content that is displayed on the screen while also looking into the visible light camera. The positions of the back-light and diffuser disclosed herein are believed to enable enhanced display quality, better energy efficiency, and/or smaller sizes, compared to, for example, systems including rear or front projectors or transparent organic light emitting diodes.

Figure 1:
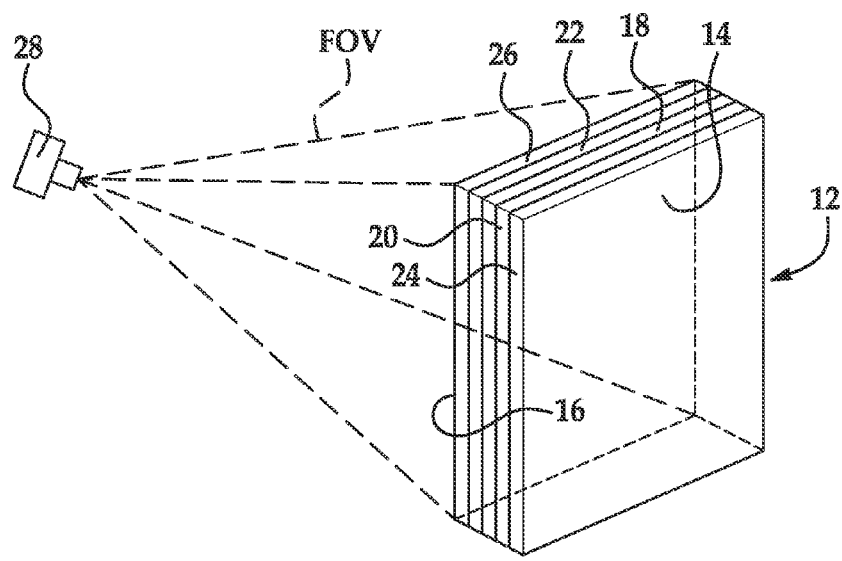
FIG. 1 is a semi-schematic perspective view illustrating a field of view of a visual light camera positioned behind a liquid crystal panel.

Referring now to FIG. 1, a see-through screen 12 and a visible light camera 28 are depicted. The see-through screen 12 is a liquid crystal panel that includes a screen side 14 and a back side 16. The screen side 14 is the side of the panel that displays images and/or content thereon for viewing by a local user. The back side 16 is opposed to the screen side 14. Throughout this description, the see-through screen 12 will be referred to as the liquid crystal panel 12.

The liquid crystal panel 12 includes multiple layers, the center of which is a liquid crystal layer 18. The liquid crystal layer 18 may include twisted nematic liquid crystals (described further hereinbelow). Depending on whether a voltage is applied, the liquid crystal layer 18 (with two polarized panels, discussed below) acts as an electro-optic shutter. Examples of suitable liquid crystals include substituted phenyl-cyclohexane liquid crystals, cyano-biphenyl liquid crystals, substituted (1,1'-bicyclohexyl)-4-ylbenzene liquid crystals, substituted tolane liquid crystals, substituted diphenyl-diacetylene liquid crystals, substituted diphenylhexendiyne liquid crystals, and substituted bistolane liquid crystals.

Operatively connected to opposed sides of the liquid crystal layer 18 are electrode layers 20, 22. One electrode layer 20 (i.e., the electrode layer positioned closer to the screen side 14) may be a transparent substrate with transparent electrodes patterned thereon. The pattern of the transparent electrodes determines the shapes that will appear when the liquid crystal panel 12 is turned ON. The other electrode layer 22 (i.e., the electrode layer positioned closer to the back side 16) may be a transparent substrate with a transparent common electrode established thereon. An example of the transparent substrate for each of the electrode layers 20, 22 includes glass, and examples of suitable electrode materials include indium tin oxide (ITO) or polyethylenedioxythiophene polystyrene-sulfonate (PEDOT:PSS), etc.

Positioned adjacent to each of the electrode layers 20, 22 are respective polarized panels 24, 26, each of which includes a glass filter and a polarizing film. The polarized panel 26 includes its glass filter, which has a microscopically grooved surface facing the liquid crystal layer 18, and its polarizing film attached to a surface opposed to the microscopically grooved surface. The orientation of the polarizing film of the polarized panel 26 is in the same direction as the microscopically grooved surface of the glass filter of the polarized panel 26. Similarly, the polarized panel 24 includes its glass filter, which also has a microscopically grooved surface facing the liquid crystal layer 18, and its polarizing film attached to a surface opposed to the microscopically grooved surface. While the orientation of the polarizing film of the polarized panel 24 is in the same direction as the microscopically grooved surface of the glass filter of the polarized panel 24, this orientation is at a right angle with respect to the orientation of the grooves and polarized film of the polarized panel 26. As such, if the grooves and the polarized film of the polarized panel 26 are oriented vertically, the grooves and the polarized film of the polarized panel 24 are oriented 90° with respect to the vertical orientation. While not shown, the liquid crystal panel 12 may also include a glass cover adjacent to the polarized panel 24 that forms the screen side 14.

The grooves, for example, in the glass filter of the polarized panel 26 cause a first sub-layer of the nematic liquid crystals (e.g., a layer deposited on the glass filter of the polarized panel 26) to align with the orientation of the polarized panel 26. Successive sub-layers of nematic liquid crystals that are deposited will gradually twist until the outermost sub-layer is at a 90° angle with respect to the orientation of the crystals in the first sub-layer. As such, the nematic liquid crystals in the outermost sub-layer match the orientation of the polarized panel 24. In this example then, the liquid crystal layer 18 includes multiple sub-layers of nematic liquid crystals.

Light is polarized as it strikes the polarized panel 26. The nematic liquid crystals in each sub-layer of the liquid crystal layer 18 then guide the light they receive to the next sub-layer. As the light passes through the liquid crystal sub-layers, the liquid crystals change the light's plane of vibration to match their own angle. As such, when the light reaches the outermost sub-layer of liquid crystals, it vibrates at the same angle as the outermost sub-layer. When the orientation of the crystals in the outermost sub-layer is matched up with the orientation of the polarized panel 24, then the light will pass through the panel 24 and out of the panel 12.

A voltage applied to the respective surrounding electrode layers 20, 22 may alter the alignment of the liquid crystals in the sub-layers of the liquid crystal layer 18 to control the transmission of light. As described above, in the twisted configuration, the liquid crystals are arranged in a helical structure and allow light from the backlight (i.e., light source(s) 30) to pass through. In this configuration, pixels are white and the screen 12 is transparent. In proportion to the voltage that is applied, the liquid crystals untwist. When the crystals straighten out, they change the angle of the light passing through them so that the angle of the light no longer matches the angle/orientation of the polarized panel 24. At the areas where the angles do not match, light cannot pass through the panel 12 and those areas become darker than the surrounding areas. By properly adjusting the level of the voltage almost any grey level (e.g., black when pixels are opaque) can be achieved. When grey levels or other colors are displayed, the transparency of the pixel is proportional to the intensity of the pixel. For colored systems, a non-diffusive transparent color filter array may be included in the liquid crystal panel 12, for example, between the polarized panel 24 and any glass cover.

In the example shown in FIG. 1, a visible light camera 28 is positioned a spaced distance from the back side 16 of the liquid crystal panel 12. The spaced distance is selected so that a field of view FOV of the visible light camera 28 encompasses all or a fraction of an area of the back side 16 of the liquid crystal panel 12. As such, the depth at which the visible light camera 28 is positioned with respect to the back side 16 depends, at least in part on the field of view FOV of the visible light camera 28 that is used. In the example shown in FIG. 1, the field of view FOV encompasses all of the area of the back side 16. However, it is to be understood that the field of view FOV may encompass a portion of the entire area of the back side 16. For example, the visible light camera 28 may be positioned so that the perimeter of the field of view FOV is 1 inch from each of the edges of the liquid crystal panel 12. This example may be desirable, for example, when only part of the panel 12 is to be used for remote collaboration. In some instances, the FOV of the visible light cameras 28 may be larger than the perimeter of panel 12, and hardware and/or programming may be used to crop captured images to match the perimeter of the panel 12.

As mentioned above, the positioning of the camera 28 depends upon its field of view FOV. In an example, if the camera 28 has a 90° diagonal field of view, then for the field of view FOV to encompass an entire X-inch diagonal panel 12, the camera 28 would have to be placed X/2 inches from the back side 16 of the panel 28.

Examples of visible light cameras 28 use visible light to capture images through the liquid crystal panel 12. The visible light camera 28 may include a digital charge couple device (CCD) or complementary metal-oxide-semiconductor (CMOS) active pixel sensors. Any commercially available visible light camera 28 may be used in the examples disclosed herein.

The examples of the display-camera system disclosed herein include the liquid crystal panel 12 and the visible light camera 28 of FIG. 1. Additionally, these systems include a visible light source (see reference numeral 30 in FIGS. 2-5 and reference numerals 30, 30' in FIG. 6) positioned a spaced distance from the back side 16 of liquid crystal panel 12, and a diffuser (see reference numeral 32 in FIGS. 2-3B, 32' in FIGS. 4 and 5, and both 32 and 32' in FIG. 6) positioned between the visible light source 30 and the back side 16. Examples of the display-camera systems are labeled reference numerals 10, 10', and 10" in FIGS. 2, 4 and 6, respectively. Each of these systems 10, 10', 10" will be discussed further herein in reference to the respective figures.

Figure 2:
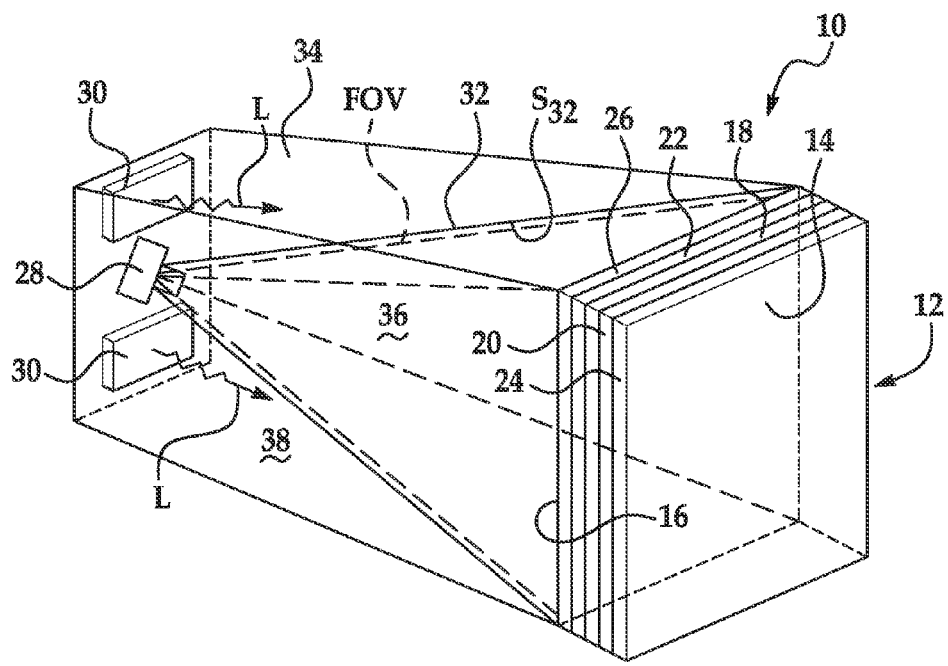
FIG. 2 is a semi-schematic perspective view of an example of the display-camera system.

Referring now to FIG. 2, an example of the display-camera system 10 is depicted having the visible light source 30 positioned any spaced distance from the back side 16 as long as the light source 30 is outside of the field of view FOV of the visible light camera 28 and within a housing 34 of the system 10. The light source 30 is positioned outside the field of view FOV, but so that light L can illuminate the diffuser 32. The visible light source 30 functions as the backlight of the system 10. The positioning of the visible light source 30 away from the back side 16 and outside of the field of view FOV of the camera 28 is believed to keep the camera 28 from directly seeing the light L from the visible light source 30. This may be advantageous because images captured by the visible light camera 28 will not contain bright regions that may otherwise result from the visible light source 30 (i.e., backlight).

It is to be understood that a single light source 30 may be used, or multiple light sources 30 may be used. For example, the visible light source 30 may be one or more point lights (e.g., arranged in an array), line lights, surface lights (i.e., plate shaped lights), or various combinations of multiple types of lights. Specific examples of suitable visible light sources 30 include filament lamps, light emitting diodes (LED), arc lamps, or the like.

In the example of the display-camera system 10 shown in FIG. 2, the diffuser 32 is also positioned outside of the field of view FOV of the visible light camera 28. In the example shown in FIG. 2, the diffuser 32 is positioned just outside and along the lines of the field of view FOV. When the diffuser 32 is positioned along the field of view FOV, the interior surface of the diffuser $S_{32}$ is shaped similarly to the field of view FOV of the camera 28. In such instances, the diffuser 32 may lie directly along the field of view FOV, or the diffuser 32 may be set some distance from the field of view (i.e., the diffuser 32 is wider than, but has the same shape as, the field of view FOV). In other examples, the diffuser 32 may be shaped so that it is curved away from the field of view FOV. In general, the diffuser 32 is positioned outside of the field of view FOV in a manner so that any sight line through the panel 12 hits the diffuser 32.

The diffuser 32 in this example may be a single piece or multiple pieces that are operatively connected together. The diffuser 32 may be attached to the edges of the back side 16 and to the camera 28 (e.g., around the lens of the camera 28) so that an enclosed spaced 36 is formed between the camera lens and the back side 16. The boundary of this enclosed space 36 is defined by the interior surface $S_{32}$ of the diffuser 32 and thus, in some examples, may be along the field of view FOV of the visible light camera 28.

The diffuser 32 may be attached to the back side 16 and to the camera 28 via any suitable adhesion mechanism. In an example, the diffuser 32 may be attached via an adhesive.

Any translucent diffuser 32 may be used in the example of the system 10 shown in FIG. 2. A translucent diffuser 32 allows light L, but not detailed images, to pass through and be diffused in all directions. Examples of suitable diffusers 32 include a ground-glass diffuser, an opal glass diffuser, TEFLON® diffusers, greyed glass diffusers, or the like.

Figure 3A:
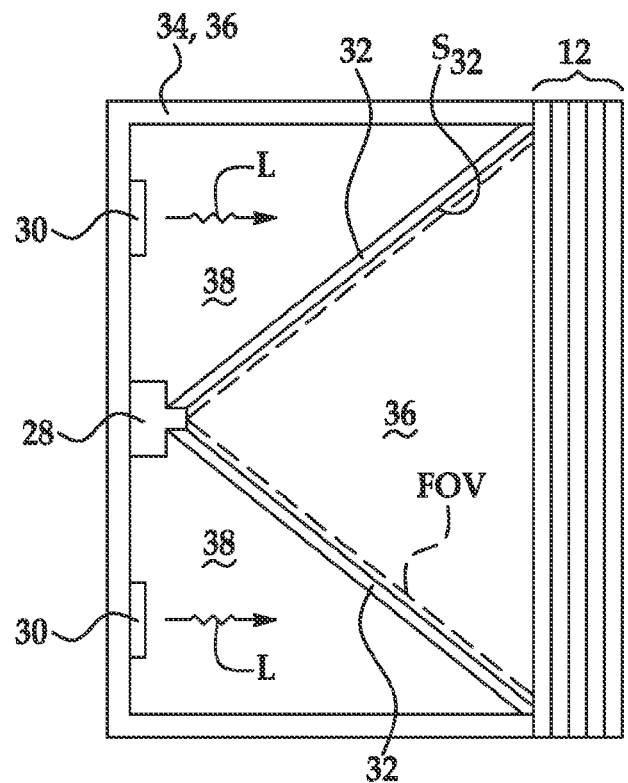
FIG. 3A is a semi-schematic side view of the example of the display-camera system shown in FIG. 2.
Figure 3B:
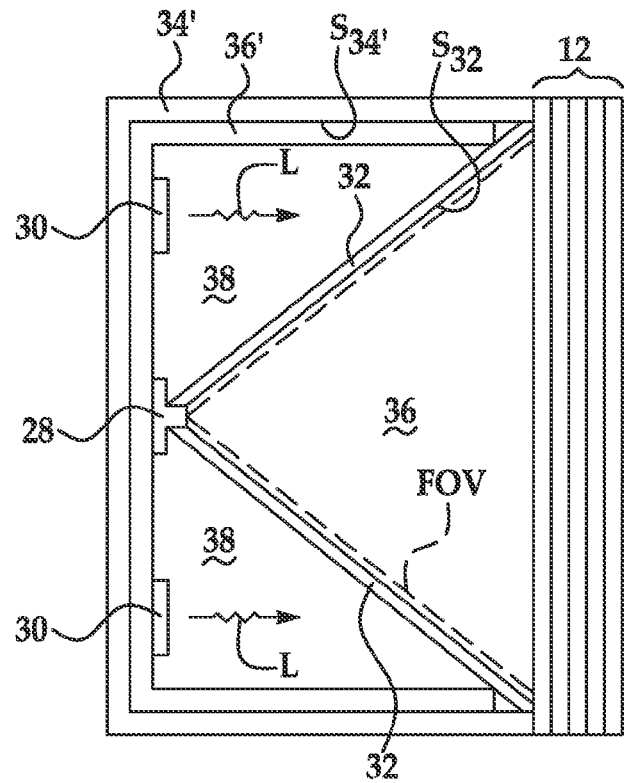
FIG. 3B is a semi-schematic side view of the display-camera system shown in FIG. 2 with a reflector positioned on an interior surface of a housing.

As mentioned above, the display-camera system 10 includes a housing 34 or 34'. FIGS. 2 and 3A depict the example of the housing 34, and FIG. 3B depicts the example of the housing 34'. In general, the housing 34 or 34' defines a three-dimensional volume 38 that is adjacent to and extends outward from the back side 16 of the liquid crystal panel 12. The three-dimensional volume 38 may have the visible light camera 28, the visible light source 30, and the diffuser 32 positioned therein. As such, the three-dimensional volume 38 also includes the enclosed space 36.

Referring now to FIGS. 2 and 3A together, the housing 34 is made up of a reflective material, and thus is a reflector 36. Any suitable reflective material that is sturdy enough to also function as the housing 34 may be used. As examples, the housing 34/reflector 36 is made of metal (e.g., aluminum, silver, etc.) or polymeric materials (e.g., polystyrene) that are filled with a reflective material (e.g., titania).

As illustrated in FIGS. 2 and 3A, the visible light source 30 is secured to the housing 34/reflector 36 so that light L emitted from the light source 30 is directed towards the back side 16 or one of the sides of the housing 34. The housing 34/reflector 36 can redirect light L toward the back surface 16, and thus is placed to increase the brightness of the light L.

In FIG. 3A, the housing 34/reflector 36 may have any thickness that is strong enough to support the camera 28 and the light source 30. Similarly, in FIG. 3B, the housing 34' may have any thickness that is strong enough to support the camera 28 and the light source 30.

Referring now to FIG. 3B, the housing 34' is made up of a non-reflective material (e.g., a polymeric material or a cardboard material) that has a reflective material positioned on an interior surface $S_{34'}$ thereof. In this example then, the reflector 36' is a separate layer that is formed on the interior surface $S_{34'}$ of the housing 34'. Any of the previously mentioned reflective materials may be used to form the reflector 36'. The reflective material may be adhered to the housing 34' to form the reflector 36', or the reflective material may be electroplated into the housing 34' to form the reflector 36'. The reflector 36' may have a thickness ranging from about 0.001 mm to about 10 mm.

While in FIG. 3B the reflector 36' is shown formed on the entire interior surface $S_{34'}$ of the housing 34', it is to be understood that the reflector 36' may be formed on discrete portions of the interior surface $S_{34'}$. For example, the reflective material may be selectively deposited so that the reflector 36' that is formed is located between the interior surface $S_{34'}$ and the back side of the visible light source(s) 30 positioned on the interior surface $S_{34'}$. The reflector 36' may be located at any position that enables the reflector 36' to redirect light L toward the back surface 16 and/or to increase the brightness of the light L.

As illustrated in FIGS. 2, 3A and 3B, both the camera 28 and the visible light source 30 are secured to the housing 34/reflector 36 or the reflector 36'. The camera 28 and the visible light source 30 may be adhered or otherwise mounted to or within the housing 34/reflector 36 or the reflector 36'. The camera 28 in these examples may be positioned anywhere so that the field of view FOV encompasses the desired portion of the liquid crystal panel 12. The visible light source 30 in these examples may be positioned anywhere between the diffuser 32 and the housing 34 or the reflector 36'. As examples, the light source 30 may be suspended from the housing 34 or the reflector 36', may be recessed into the housing 34 or the reflector 36', or may be secured to various points on the housing 34 or the reflector 36' so that the portion of the light source 30 between the various points extends across part of the three-dimensional volume 38.

In any of the examples disclosed in FIGS. 2, 3A and 3B, the visible light camera 28 may include a light positioned therein or thereon. This camera light may be the same type of light as the visible light source 30. As examples, the camera light may be positioned surrounding the lens of the camera 28, on the center of the camera lens, behind a small portion of the camera lens, or at any other desirable position. This camera light may be operated to light up when the camera 28 is not being used to take an image. This additional light can aid in rendering the area of the liquid crystal panel 12 that is directly in front of the camera 28 (e.g., if looking through the screen side 14 of the panel 12) as bright as the surrounding areas. In an example, the camera 28 may be capable of automatically turning the camera light on or off, depending upon whether an image is being taken. In other words, the camera 28 may be synchronized with the light positioned therein or thereon.

Figure 4:
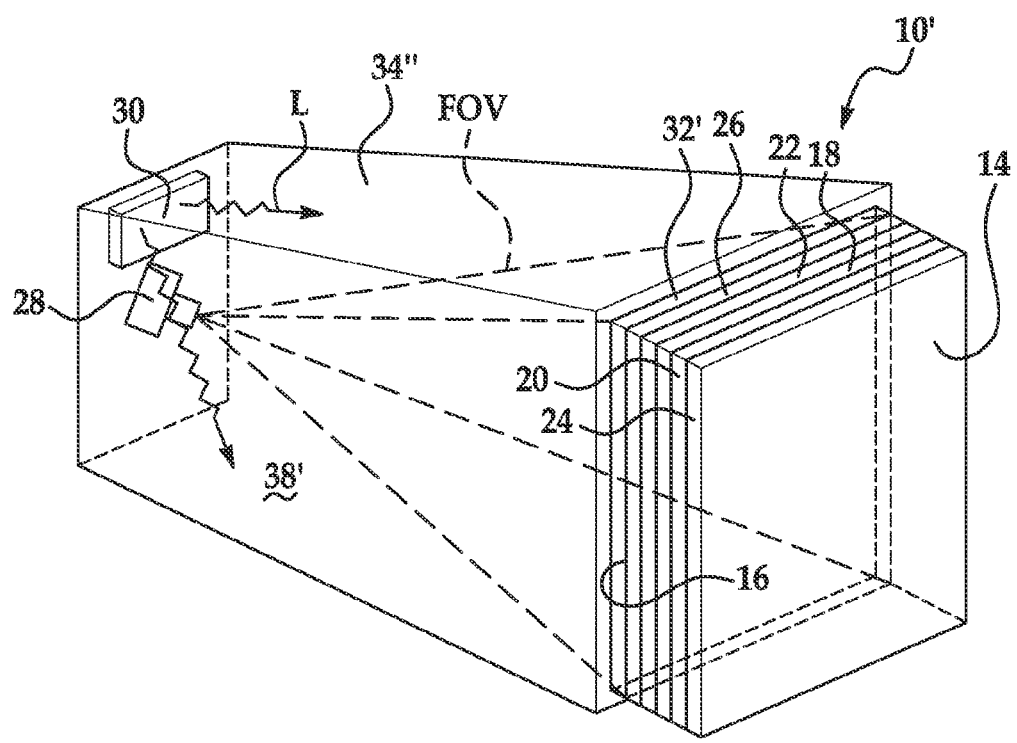
FIG. 4 is a semi-schematic perspective view of another example of the display-camera system.
Figure 5:
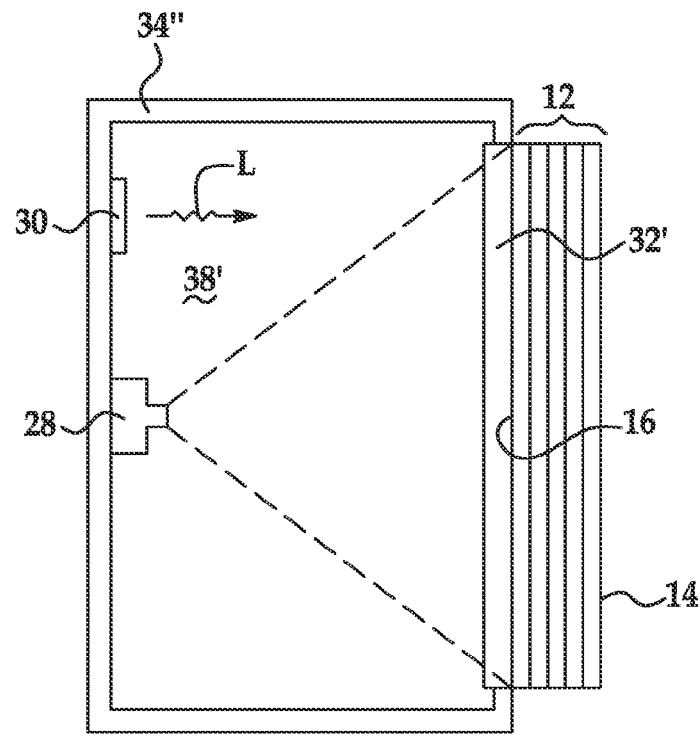
FIG. 5 is a semi-schematic side view of the example of the display-camera system shown in FIG. 4.

Referring now to FIGS. 4 and 5, another example of the remote collaboration system 10' is depicted having a holographic diffuser 32' attached to the back side 16 of the liquid crystal panel 12 and a visible light source 30 positioned at a particular location that is a spaced distance from the back side 16. The holographic diffuser 32' may be adhered to the liquid crystal panel 12 using an optically transparent adhesive.

The particular location of visible light source 30 in these examples may be determined by the process that is used to create the holographic diffuser 32'. The holographic diffuser 32' is made up of holographic elements that bend and shape light L from a particular direction (e.g., that of a reference beam used to create the diffuser 32') so that light from this direction is diffused while light from all other directions (e.g., light entering through the panel 12 and into the lens of the camera 28) is allowed to pass through the diffuser 32' unaffected. For any given holographic diffuser 32', it is to be understood that diffusing angles may be given for a collimated input beam and angular divergence may vary for different incidence angles. As such, the light source 30 may be positioned at a location that is within a specified deviation from an angle of incidence for the holographic diffuser 32'. For example, one may determine the location of the light source 30 with respect to the holographic diffuser 32' using a graph of diffusion efficiency versus deviation from a specified angle of incidence. As such, the position of the visible light source 30 in this example system 10' depends upon the holographic diffuser 32' that is selected.

Any of the previously described light sources 30 may be utilized, as long as the light source 30 is positioned in the suitable location with respect to the holographic diffuser 32'.

Any of the previously described visible light cameras 28 may also be used. It is to be understood that the camera 28 may be placed to look through the diffuser 32' at any angle so long as the angle is sufficiently different from the angle of light rays L that the holographic diffuser 32' will diffuse. In an example, the camera 28 may be positioned closer to the top of the system 10' so that the camera 28 is pointing slightly downward toward the panel 12.

In the example shown in FIGS. 4 and 5, a housing 34" is made of a non-reflective and non-transparent material. In an example, the housing 34" is a non-reflective and non-transparent polymer or a cardboard material. The housing 34" defines a three-dimensional volume 38' that is adjacent to and extends outward from the holographic diffuser 32' positioned on the back side 16 of the liquid crystal panel 12. The three-dimensional volume 38' may have the visible light camera 28 and the visible light source 30 positioned therein. As shown in FIGS. 4 and 5, the housing 34" may be attached to the edges of the holographic diffuser 32' so that the holographic diffuser 32' is contained within the housing 34". It is to be understood that the housing 34" may be extended to attach to the edges of any or all of the layers 18, 20, 22, 24, 26 of the liquid crystal panel 12.

As illustrated in FIGS. 4 and 5, both the camera 28 and the visible light source 30 are secured to the housing 34". The camera 28 and the visible light source 30 may be adhered or otherwise mounted to or within the housing 34". The camera 28 in this example may be positioned anywhere so that the field of view FOV encompasses the desired portion of the liquid crystal panel 12. As noted above, the visible light source 30 in this example may be positioned at a location specified by the holographic diffuser 32' being used. The visible light source 30 in this example may be positioned in the predetermined location by securing it to the housing 34", by suspending it from the housing 34", or by recessing it in the housing 34".

Figure 6:
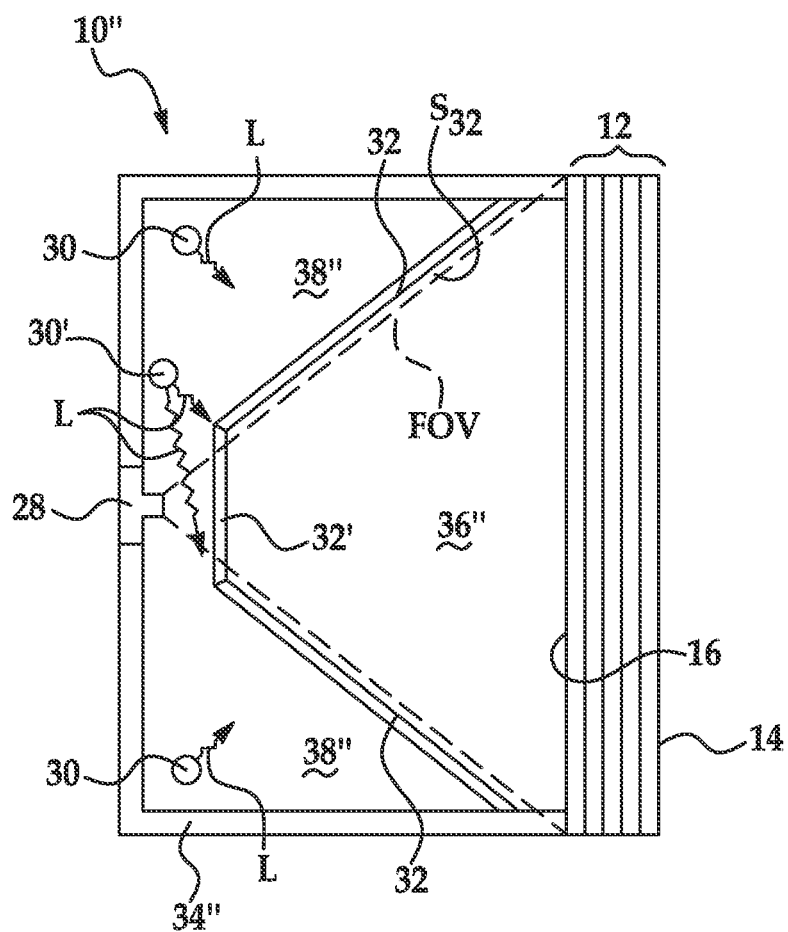
FIG. 6 is a semi-schematic side view of another example of the display-camera system.

Referring now to FIG. 6, a hybrid display-camera system 10" is depicted which includes components of the system 10 shown in FIG. 2 and of the system 10' shown in FIG. 4. In this example system 10", both the translucent diffuser 32 and the holographic diffuser 32' are included. This system 10" may be desirable because the holographic diffuser 32' is less likely to be illuminated by ambient light when the system 10" is in transparent mode, and thus is less likely to add any diffused light to the image(s) captured by the camera 28.

As shown in FIG. 6, the holographic diffuser 32' is positioned a spaced distance from the camera 28 and a spaced distance from the back side 16 of the panel 12. The spaced distances may be the same or different. In the example shown, the holographic diffuser 32' is relatively small in size and is positioned closer to the lens of the camera 28. However, it is to be understood that the holographic diffuser 32' could be larger in size and positioned closer to the back side 16. In any instance, the holographic diffuser 32' should be selected so that the field of view FOV extends therethrough. As such, the holographic diffuser 32' will be larger in size the closer to the back side 16 that it is positioned.

The translucent diffuser 32 is positioned in any desirable manner outside the field of view FOV of the camera 28 so that the diffuser 32 extends from the holographic diffuser 32' to the back side 16. The diffuser 32 may be attached to the edges of the back side 16 and to the edges of the holographic diffuser 32' so that an enclosed spaced 36" is formed between the holographic diffuser 32' and the back side 16. At least a portion of the boundary of this enclosed space 36" is defined by the interior surface $S_{32}$ of the diffuser 32. The diffuser 32 may be attached to the back side 16 and to the holographic diffuser via any suitable adhesion mechanism. In an example, the diffuser 32 may be attached via an adhesive or an optically transparent adhesive. It is to be understood that in examples where the holographic diffuser 32' is moved closer to the back side 16, the size of the diffuser 32 will become smaller.

The example shown in FIG. 6 also includes the light source 30. An additional light source 30' may be used that is specifically positioned (as previously described) for the holographic diffuser 32' that is used. The light source 30' may be any of the examples of the light source 30.

Similar to the example shown in FIGS. 4 and 5, the example shown in FIG. 6 includes the non-reflective and non-transparent housing 34". The housing 34" in this example defines a three-dimensional volume 38" that is adjacent to and extends outward from back side 16 of the liquid crystal panel 12. The three-dimensional volume 38" may have the diffusers 32 and 32' and the visible light sources 30, 30' positioned therein. In the example shown in FIG. 6, the three-dimensional volume 38" also includes a portion of the camera 28, which is partially embedded in the housing 34".

The housing 34" in FIG. 6 is shown attached to the back side 16. However, it is to be understood that the housing 34" may be extended to attach to the edges of any or all of the layers 18, 20, 22, 24, 26 of the liquid crystal panel 12.

Similar to the other examples disclosed herein, the camera 28 and the visible light sources 30, 20' may be adhered or otherwise mounted to or within the housing 34". The camera 28 in this example may be positioned anywhere so that the field of view FOV encompasses the desired portion of the liquid crystal panel 12. As noted above, the visible light source 30' in this example may be positioned at a location specified by the holographic diffuser 32' being used, and the other light source 30 may be positioned anywhere outside of the field of view FOV of the camera 28. The visible light sources 30, 30' in this example may be secured to the housing 34", suspended from the housing 34", or recessed in the housing 34".

In FIGS. 2-6, the camera 28 is shown at least partially within the three-dimensional volumes 38, 38', 38". However, it is to be understood that the camera 28 may be located outside of the three-dimensional volume 38, 38', 38". For example, the camera 28 could be completely integrated within a wall of the housing 34, 34', 34" which includes an aperture for the lens, and thus would not be contained within the three-dimensional volume 38, 38', 38".

While not shown in the figures, it is to be understood that suitable electronics (e.g., wires, traces, circuits, etc.) may be included to selectively address the electrode layers 20, 22 of the panel 12, the light source 30, 30' and the camera 28 in order to operate the display-camera systems 10, 10', 10" in a desirable manner.

The electronics of the systems 10, 10', 10" may be operatively connected to hardware and programming to operate the systems 10, 10', 10", and in particular, to perform remote interaction or collaboration with another system 10, 10', 10" and/or to perform a time-multiplexing technique. Using the time-multiplexing technique, when the camera 28 is capturing an image, the hardware and/or programming may cause the panel 12 to display a white image, thereby rendering the panel 12 fully transparent. The hardware and/or programming may otherwise cause a portion of the panel 12 to display a white image, thereby rendering the panel 12 spatially-varying transparent.

During either of these operations, the hardware and/or programming may cause the light source(s) 30, 30' to be turned off to keep excessive light from reaching the camera 28. This may also avoid adding a white appearance to the image being captured. During other operations, the hardware and/or programming may cause the light source(s) 30, 30' to be turned on while the camera 28 is capturing an image (e.g., whether or not a white image is partially or fully displayed). This may be advantageous in some instances, for example, when increased brightness is desirable. In the time-multiplexing technique, when the camera 28 is not capturing an image, the hardware and/or programming may cause the panel 12 to display contents in a typical fashion (e.g., in color or in the gray scale) and may cause the light source(s) 30, 30' to be turned on. In other operations, the light source(s) 30, 30' may be turned off when the camera 28 is not capturing an image. This may be desirable to generate a better black level. In another example, the light source(s) 30, 30' may be turned on when the camera 28 is capturing an image, and the light source(s) 30, 30' may be turned off when the panel 12 is rendering a dark image.

The hardware, programming, or combinations thereof used to operate the systems 10, 10', 10" may be part of a local computing device. The display-camera system 10, 10', 10"

may be operatively connected to a local computing system via a link. The link may be one or more of cable, wireless, fiber optic, or remote connections via a telecommunication link, an infrared link, a radio frequency link, or any other connectors or systems that provide electronic communication. Links may include, at least in part, an intranet, the Internet, or a combination of both. The links may also include intermediate proxies, routers, switches, load balancers, and the like. Links may also connect one display-camera system 10, 10', 10" with one or more other display-camera systems 10, 10', 10".

The local computing system may be any personal computer, portable computer, content server, a network PC, a personal digital assistant (PDA), a cellular telephone or any other computing device that is capable of performing the functions for receiving input from, and/or providing control or driving output to the camera 28, light source(s) 30, 30', panel 12, etc.

The programming may be processor executable instructions stored on non-transitory, tangible memory media, and the hardware may include a processor for executing those instructions. In an example, the memory stores program instructions that, when executed by a processor, operate the camera 28, the light source(s) 30, 30', the panel 12, etc. It is to be understood that the memory may be integrated in the same device as the respective processor, or it may be separate from, but accessible to the local computing system and processor. Examples of non-transitory, tangible memory media may include any one of many physical media such as, for example, electronic, magnetic, optical, electromagnetic, or semiconductor media. More specific examples include a portable magnetic computer diskette such as floppy diskettes or hard drives, a random access memory (RAM), a read-only memory (ROM), an erasable programmable read-only memory (EPROM), or a portable CD, DVD, or flash drive.

In an example, the program instructions may be part of an installation package that can be executed by the processor to run the remote collaboration system 10, 10'. In these instances, the memory may be a portable medium, such as a compact disc (CD), a digital video disc (DVD), or a flash drive; or the memory may be a memory maintained by a server from which the installation package can be downloaded and installed on the local computing system. In another example, the program instructions may be part of an application or applications already installed on the local computing system. In this other example, the memory may include integrated memory, such as a hard drive.

In another example, respective display-camera systems 10, 10', 10" may also be connected via links and a cloud computing system. As used herein, the cloud computing system refers to a computing system including multiple pieces of hardware operatively coupled over a network so that they can perform a specific computing task. The cloud includes a combination of physical hardware, software, and virtual hardware. The cloud computing system is configured to (i) receive requests from the computing devices that are part of the display-camera systems 10, 10', 10" (or from users using those computing devices), and (ii) return request responses. As examples, the cloud computing system may be a private cloud, a public cloud or a hybrid cloud. Further, the cloud may be a combination cloud computing system including a private cloud (or multiple private clouds) and a public cloud (or multiple public clouds).

The physical hardware may include, among others, processors, memory devices, and networking equipment. The virtual hardware is a type of software that is processed by the physical hardware and designed to emulate specific hardware. As an example, virtual hardware may include a virtual machine (VM), i.e., a software implementation of a computer that supports execution of an application like a physical machine. An application, as used herein, refers to a set of specific instructions executable by a computing system for facilitating carrying out a specific task. For example, an application may take the form of a web-based tool providing the system 10, 10', 10" with a specific functionality, e.g., operating the camera 28, light source(s) 30, 30', etc. Software is a set of instructions and data configured to cause virtual hardware to execute an application. As such, the cloud computing system can render a particular application available to the system 10, 10', 10" and/or its respective users.

Executing an application in the cloud may involve receiving a number of requests (e.g., requests to run the systems 10 and/or 10' and/or 10"), processing the requests according to the particular functionality implemented by the application, and returning request responses. For executing the application, the resources (e.g., physical hardware, virtual hardware, and software) of the cloud computing system may be scaled depending on the demands posed on the application. For example, cloud may vary the size of the resources allocated to the application depending on the number of requests, the number of users or systems 10, 10', 10" interacting with the application, or requirement on the performance of the application (e.g., a maximum response time). While not shown, it is to be understood that the cloud may also include an interface that allows any local computing devices to communicate with the components of the cloud.

The hardware of the cloud computing system may include a processor and a memory. The processor may be any processor that is capable of executing program instructions stored in the memory to perform, for example, operation of the systems 10, 10', 10". The memory may include an operating system and applications, such as an application implemented in C++. The operating system may be a collection of programs that, when executed by the processor, serve as a platform on which the application can run. Examples of operating systems include, for example, various versions of Linux® and Microsoft's Windows®. This type of hardware may also be included in the local computing systems described above.

Throughout the description of the local and cloud based computing systems, many of the components are defined, at least in part, as programs, programming, or program instructions. Each of these components, portions thereof, or various combinations thereof may represent in whole or in part a module, segment, or portion of code that includes one or more executable instructions to implement any specified logical function(s). Each component or various combinations thereof may represent a circuit or a number of interconnected circuits to implement the specified logical function(s).

The examples disclosed herein may be realized in any non-transitory, tangible computer-readable media for use by or in connection with an instruction execution system (e.g., computing systems), such as a computer/processor based system, or an ASIC (Application Specific Integrated Circuit), or another system that can fetch or obtain the logic from computer-readable media and execute the instructions contained therein. Non-transitory, tangible computer-readable media may be any media that is capable of containing, storing, or maintaining programs and data for use by or in connection with the computing systems, examples of which have been described above.

It is to be understood that the ranges provided herein include the stated range and any value or sub-range within the stated range. For example, a range from about 0.001 mm to about 10 mm should be interpreted to include not only the explicitly recited limits of about 0.001 mm to about 10 mm, but also to include individual values, such as 0.5 mm, 2 mm, 5.3 mm, etc., and sub-ranges, such as from about 0.1 mm to about 7 mm, from about 1.5 mm to about 9.5 mm, etc. Furthermore, when "about" is utilized to describe a value, this is meant to encompass minor variations (up to +/−15%) from the stated value.

While several examples have been described in detail, it will be apparent to those skilled in the art that the disclosed examples may be modified. Therefore, the foregoing description is to be considered non-limiting.

What is claimed is:

1. A display-camera system, comprising:
   a liquid crystal panel having a screen side and a back side that is opposed to the screen side;
   a visible light camera positioned a first spaced distance from the back side such that a field of view of the camera encompasses all or a fraction of an area of the liquid crystal panel;
   a visible light source positioned a second spaced distance from the back side and outside of the field of view of the camera;
   a diffuser positioned between the visible light source and the back side and outside of the field of view of the camera, wherein the diffuser is attached to perimeter edges of the back side and to the visible light camera; and
   an enclosed space formed between a lens of the visible light camera and the back side of the liquid crystal panel, a boundary of the enclosed space being defined by an interior surface of the diffuser.

2. The display-camera system as defined in claim 1 wherein the diffuser is attached to the visible light camera around the lens.

3. A display-camera system, comprising:
   a liquid crystal panel having a screen side and a back side that is opposed to the screen side;
   a visible light camera positioned a first spaced distance from the back side such that a field of view of the camera encompasses all or a fraction of an area of the liquid crystal panel;
   a visible light source positioned a second spaced distance from the back side and outside of the field of view of the camera;
   a diffuser positioned between the visible light source and the back side and outside of the field of view of the camera; and
   a reflector that defines at least a portion of a three-dimensional volume that is adjacent to the back side, wherein the visible light source and the diffuser are within the three-dimensional volume.

4. The display-camera system as defined in claim 3, further comprising a housing that defines the three-dimensional volume, wherein the reflector is a layer positioned on an interior surface of the housing.

5. The display-camera system as defined in claim 3 wherein the reflector forms a housing that defines the entire three-dimensional volume.

6. The display-camera system as defined in claim 3, further comprising a light positioned inside of the visible light camera.

7. The display-camera system as defined in claim 1 wherein the liquid crystal panel includes a liquid crystal array sandwiched by two polarized panels and two electrode-containing layers.

8. A display-camera system, comprising:
   a liquid crystal panel having a screen side and a back side that is opposed to the screen side;
   a visible light camera positioned a first spaced distance from the back side such that a field of view of the camera encompasses all or a fraction of an area of the liquid crystal panel;
   a visible light source positioned a second spaced distance from the back side and outside of the field of view of the camera;
   a diffuser positioned between the visible light source and the back side and outside of the field of view of the camera, wherein the diffuser is a holographic diffuser positioned a third spaced distance from the visible light camera and a fourth spaced distance from the back side;
   an other diffuser positioned outside the field of view of the camera from the holographic diffuser to the back side; and
   an other light source positioned within a specified deviation from an angle of incidence for holographic diffuser.

9. A method for using the display-camera system as defined in claim 1, the method comprising:
   displaying a white image on at least a portion of the liquid crystal panel when the visible light camera is capturing an image;
   while the white image is displayed, one of: turning off the visible light source or turning on the visible light source; and
   one of: turning on the visible light source when the visible light camera is not capturing an image or turning off the visible light source when the visible light camera is not capturing an image.

10. The method as defined in claim 9 wherein:
    while the white image is displayed, the method includes turning off the visible light source; and
    while the image is not being captured, the method includes turning the visible light source on.

11. The method as defined in claim 9 wherein:
    while the white image is displayed, the method includes turning on the visible light source; and
    while the image is not being captured, the method includes turning the visible light source off.

12. A method for making a display-camera system, comprising:
    positioning a visible light camera a first spaced distance from a back side of a liquid crystal panel;
    one of: i) positioning a diffuser between a visible light source and the back side and outside of a field of view of the visible light camera, or ii) positioning a holographic diffuser on the back side; and
    positioning the visible light source a second spaced distance from the back side and outside of the field of view of the camera; and
    incorporating a reflector into the display-camera system such that the reflector defines at least a portion of a three-dimensional volume that is adjacent to the back side.

13. The method as defined in claim 12, further comprising:
    positioning the reflector on at least a portion of an interior surface of a housing; and
    attaching the housing to the back side such that the housing defined the entire three-dimensional space.

14. A method for making a display-camera system, comprising:
    positioning a visible light camera a first spaced distance from a back side of a liquid crystal panel;
    positioning a diffuser between a visible light source and the back side outside of a field of view of the visible light camera;

positioning the visible light source a second spaced distance from the back side and outside of the field of view of the visible light camera; and attaching the diffuser to edges of the back side to form an enclosed space between the diffuser and the back side.

15. A method for making a display-camera system, comprising:

positioning a visible light camera a first spaced distance from a back side of a liquid crystal panel;

positioning a diffuser between a visible light source and the back side outside of a field of view of the visible light camera;

positioning the visible light source a second spaced distance from the back side and outside of the field of view of the camera;

positioning a holographic diffuser a third spaced distance from the visible light camera and a fourth spaced distance from the back side; and attaching the diffuser to edges of the holographic diffuser and edges of the back side to form an enclosed space between the holographic diffuser, the diffuser, and the back side.

* * * * *